Oct. 14, 1969  R. A. HALBERG ET AL  3,472,585
IMAGE LOCATING MEANS FOR A PROJECTION DEVICE
Filed July 27, 1966  4 Sheets-Sheet 1
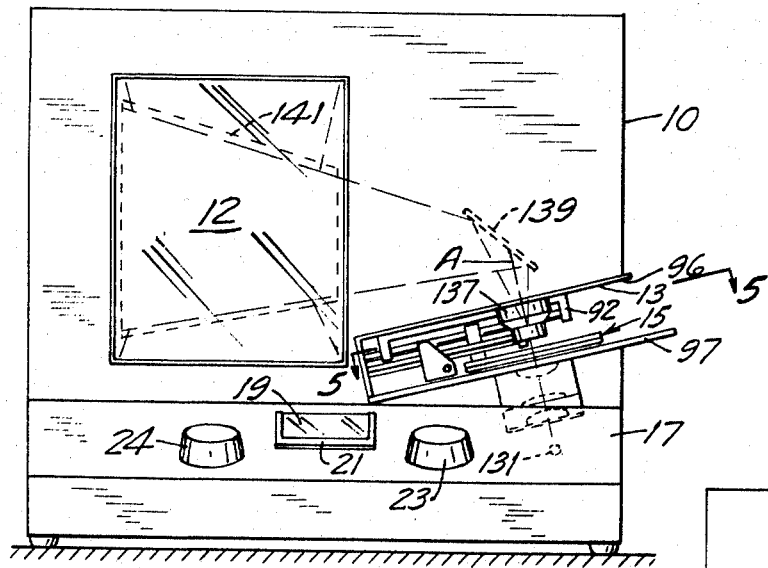
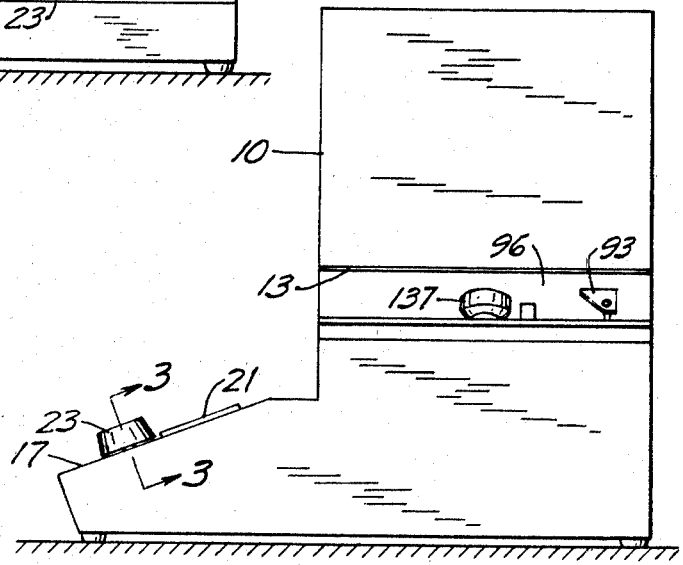
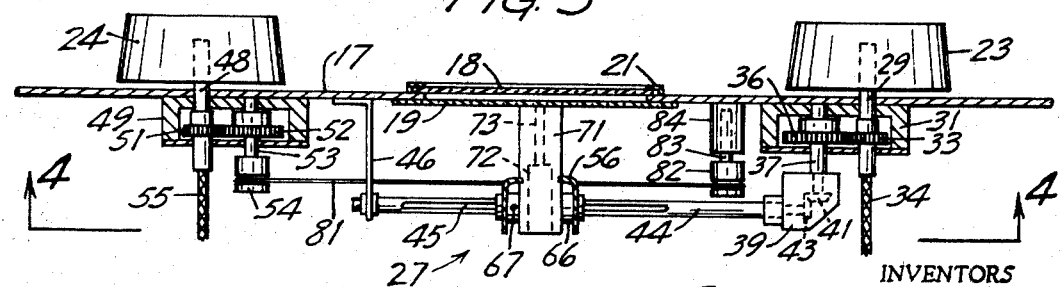
INVENTORS
ROBERT A. HALBERG
JOHN L. SUNDQUIST
BY Carpenter, Kinney & Coulter
ATTORNEYS

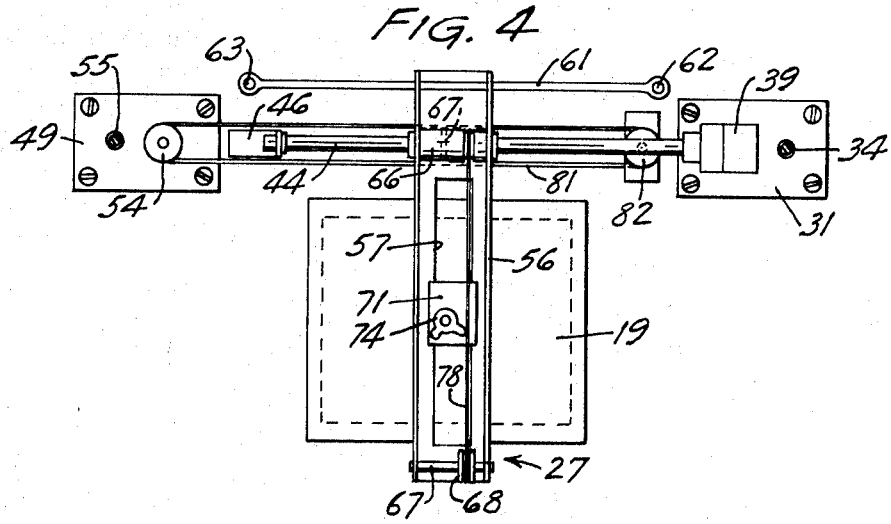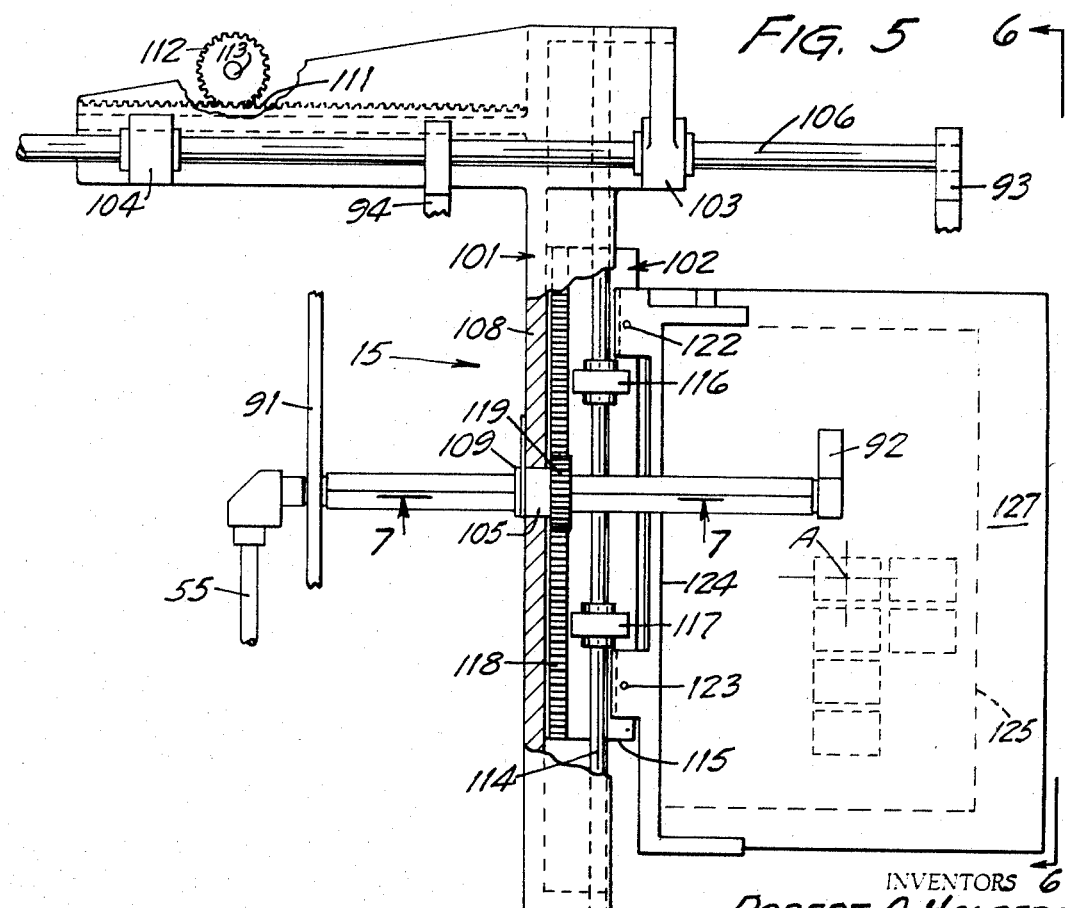

Oct. 14, 1969   R. A. HALBERG ET AL   3,472,585
IMAGE LOCATING MEANS FOR A PROJECTION DEVICE
Filed July 27, 1966   4 Sheets-Sheet 3
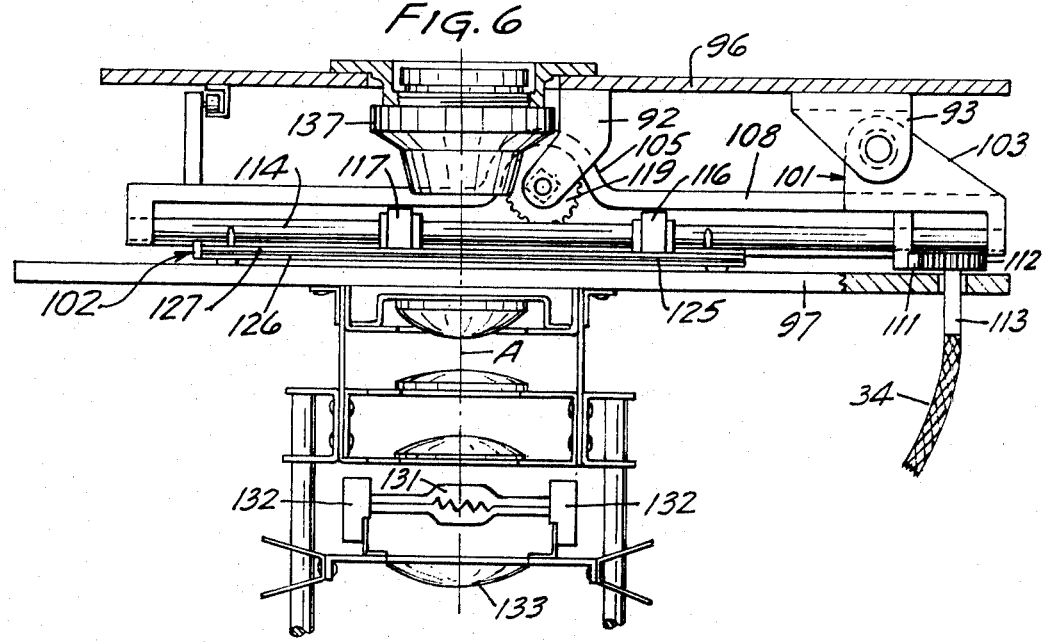
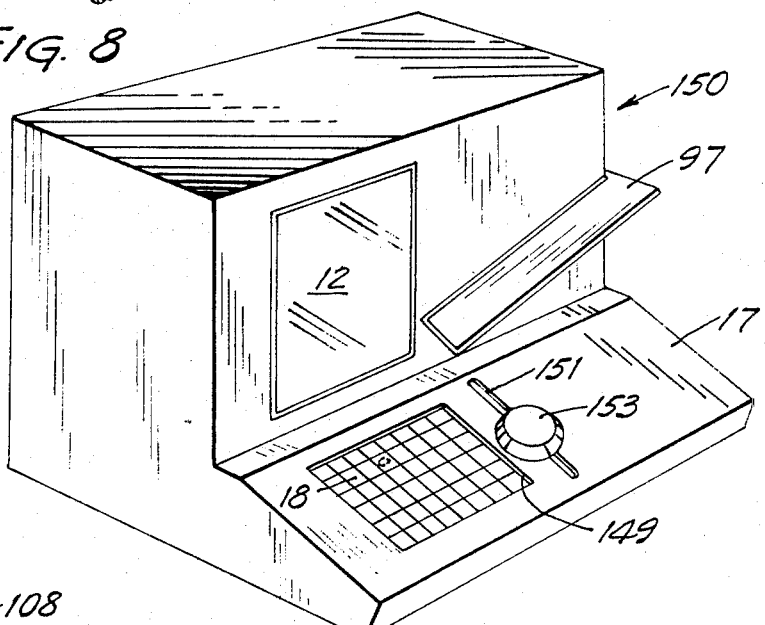
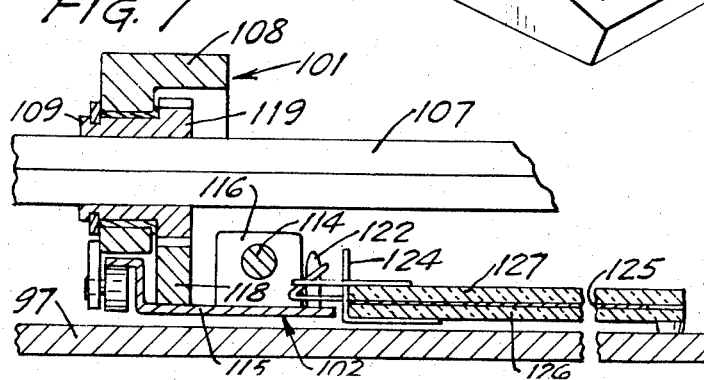
INVENTORS
ROBERT A. HALBERG
JOHN L. SUNDQUIST
BY
Carpenter Kinney+Coulter
ATTORNEYS Oct. 14, 1969  R. A. HALBERG ET AL  3,472,585
IMAGE LOCATING MEANS FOR A PROJECTION DEVICE
Filed July 27, 1966  4 Sheets-Sheet 4
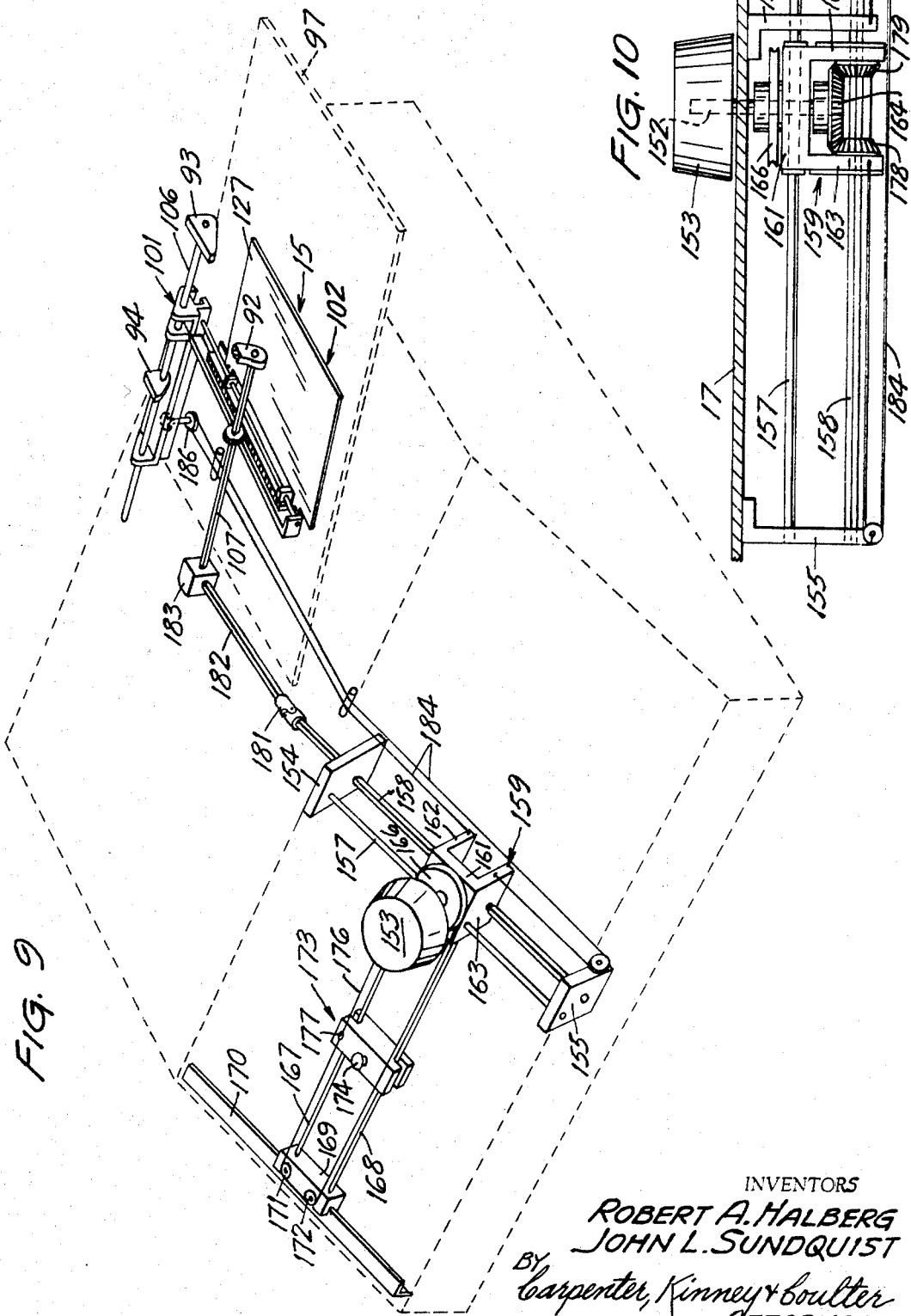
INVENTORS
ROBERT A. HALBERG
JOHN L. SUNDQUIST
BY Carpenter, Kinney & Coulter
ATTORNEYS

United States Patent Office 3,472,585
Patented Oct. 14, 1969

3,472,585
IMAGE LOCATING MEANS FOR A
PROJECTION DEVICE
Robert A. Halberg, West St. Paul, Minn., and John L. Sundquist, Bayport, Minn., assignors to Minnesota Mining and Manufacturing Company, St. Paul, Minn., a corporation of Delaware
Filed July 27, 1966, Ser. No. 568,183
Int. Cl. G03b 23/08
U.S. Cl. 353—27                                    2 Claims

ABSTRACT OF THE DISCLOSURE

A projection device for use with transparencies bearing a plurality of images having a movable transparency supporting frame positioned in the path of the projection light. A panel is provided for supporting a template bearing a format corresponding to that of the transparency for indicating the position of the images. A control device is provided for moving an indicating mechanism associated with the template to indicate the position of the transparency and frame with respect to the path of the projection light. By viewing the template and matching the indicator with a desired image location, the corresponding actual image on the transparency will be aligned with the light path.

---

This invention relates to a mechanism adapted for handling multiple area bearing sheets, film jackets or cards, and in one aspect to an orientation air for locating an image area, or portion thereof, and placing it in register with a fixed reference point or line such as with the light path of a projector.

Various methods have been used for microfilming documents to reduce the storage space needed to store copies of such documents. One such system uses a transparent multiple image film sheet or card commonly referred to as a microfiche which contains a number of microfilm images on a single sheet or which images are arranged in a predetermined order. Projectors for viewing the images from a microfiche are known but heretofore difficulty has been experienced in attempting to position a specific image area on the microfiche in register with the optical path, or in moving from one image area to another. The task of locating an image or scanning the images on these known projectors is painstaking because the projector physically obstructs a view of the optical path and transparency and because of the means by which the transparency is moved with respect to the light path of the projector.

The known projectors have used means such as a joystick or a plurality of control knobs to move a frame supporting the microfiche relative to the projection path. Also the frame might be grasped physically and moved to position the microfiche. Movement from one image to the next or the location of a single image was then accompanied by trying to watch the card during movement or by watching the viewing screen. In many known devices, to view an image to the right of the one shown on the screen the card has to be moved to the right instead of to the left as one would ordinarily expect when seeing a right reading image because of the image reversal caused by the objective lens during projection. Similarly, to locate an image on the card which is either up or down from the image being projected requires a reversal of the most logical movement. Some machines operate differently but the microfiche must be placed in the projector differently. Some coding devices for indicating rows and columns on a microfiche have been devised but such devices have limited use, for only single filing systems, and require experienced operators to reference images by rows and columns. Therefore a need exists for a control system to remove the guess work previously involved in locating an image on such microfilm sheets bearing a plurality of images.

The present invention provides a novel image locating and indicating means or system including control means for controlling movement of a transparency supporting frame relative to the light projection path. This system does not require that the operator view the actual card to afford proper manipulation. He need not guess on the direction of movement required or be experienced.

The device of the present invention provides at a glance immediate knowledge of the microfiche orientation in said device.

The present invention provides a microfiche viewer which is straightforward in its operation and reduces the time required in placing any particular image on a given card in the projection path.

The present invention involves a system comprising a transparency supporting frame movable relative to the light projection path, a support for a template bearing a format like that of the transparency, and an indicator coupled to the frame, and means affording movement of the frame and indicator to move the indicator in relation to the template and afford similar movement of the transparency frame relative to the projection light path. By viewing the template and matching an indicator with a desired image location the corresponding actual image on the microfiche will be aligned with the light path.

The advantages provided above and other novel features which will make the operation easier and simpler for one utilizing image viewing and/or copying equipment of a similar nature will be more readily apparent upon reading the following detailed description of the present invention which refers to the accompanying drawing wherein:

FIGURE 1 is a front elevational view of an image projector viewer incorporating the present invention;

FIGURE 2 is a side view of the projector viewer of FIGURE 1;

FIGURE 3 is a fragmentary detail sectional view taken generally along the lines 3—3 of FIGURE 2;

FIGURE 4 is a fragmentary detail back view of the control panel of the present invention;

FIGURE 5 is a fragmentary detail plan view taken generally along the lines 5—5 of FIGURE 1;

FIGURE 6 is an end elevation view taken along the lines 6—6 of FIGURE 5 with other parts shown schematically;

FIGURE 7 is a fragmentary sectional view taken along the lines 7—7 of FIGURE 5;

FIGURE 8 is a perspective view of a projector viewer illustrating a second embodiment of the present invention;

FIGURE 9 is a schematic view of the control system of the second embodiment; and FIGURE 10 is a fragmentary detailed view of a portion of the control mechanism of the embodiment of FIGURES 8 and 9.

The apparatus of the present invention is adapted for use in devices for handling multiple image transparencies or microfiche cards and comprises a transparency supporting frame mounted for movement in any direction in a given plane, a manipulatable control means affording movement of said frame in said plane in response to manipulation thereof, and visible indicating means coupled to said frame to indicate the location of the frame and a said transparency with relation to a reference point or the axis of a light projection system of a projector viewer and/or printer.

Referring now to the drawing and particularly to FIGURES 1 and 2, a projector viewer is illustrated which comprises a cabinet 10 providing a housing for a projection system including a light source, lenses, mirrors and screen, and the supporting structure for the same and for the transparency frame and a control system therefore.

A translucent projection screen 12 is supported on the upper front face of the cabinet and the cabinet has a cutaway section 13 allowing access to a microfiche supporting frame 15. The cabinet has a lower front portion or plate 17 which projects forwardly and downwardly at an incline with respect to the plane of the screen 12. This plate 17 supports manipulatable control means, coupling mechanism and a support for a template 19. A panel 19 formed of a light translucent material is supported by the plate 17. Means border the panel 19 to receive and support a transparent or translucent template 18. This border or support means is illustrated as a frame 21 extending around three sides of the panel 19 affording easy insertion and removal of a template 18. The templates 18 preferably have a printed format corresponding to that of the microfiche to be viewed in the apparatus.

The locating and indicating control system includes a pair of manipulatable knobs 23 and 24 positioned on the plate 17 slightly below and to the right and left of the panel 19. The control knob 23 affords vertical or up and down movement of the frame 15 supporting the transparency with respect to the light projection path while the knob 24 affords side to side movement of the frame 15 with respect to the light path. The knobs 23 and 24 also control an indicator coupled to and movable with the frame 15 but across the panel 19 and/or template 18, indicating to the operator of the projector the position of the transparency and transparency supporting frame 15 with respect to the axis of the light path, indicated in the drawing by the letter A.

FIGURES 3 and 4 illustrate in detail the structure of the knobs and indicating mechanism of FIGURES 1 and 2. The indicating means is generally identified by the reference numeral 27.

The knob 23 is fixedly mounted to a rotatable shaft 29. The shaft 29 is mounted in and extends through a box-like structure 31 supported on the back side of the plate 17.

A pinion 33 is secured to the shaft 29 and positioned within the box 31. The end of shaft 29 extending beyond the box 31 is joined to a flexible torque transmitting cable 34 which in turn is coupled to a pinion to be hereinafter described for moving the frame 15 to the right and left with respect to the light path as viewed in FIGURES 1 and 5. Internally of the box 31 the pinion 33 meshes with a gear wheel 36 which is mounted on a shaft 37 journalled in the box 31. The shaft 37 extends from the box 31 and is connected to a gear housing 39 and drives a beveled gear 41 positioned in the gear housing 39. Beveled gear 41 meshes with a second beveled gear 43 positioned in the housing 39 and fixed to drive a transversely extending shaft 44 which is circular in cross-section and formed with an axially extending diametrical slot 45. The shaft 44 is supported by the housing 39 and by an L-shaped bracket 46 affixed to the plate 17.

The knob 24 is supported on a shaft 48 which is journalled in a box-like structure 49 supported on the plate 17. The box 49 corresponds to the box 31. The shaft 48 supports a pinion 51, interiorly of the box, which pinion drives a gear wheel 52. The gear wheel 52 is fixed to a shaft 53 and drives a pulley 54. A flexible torque transmitting cable 55 is coupled to the shaft 48 for direct drive by the knob 24. Cable 55, through a gear box, drives a shaft 107 and pinion 119 to move the frame 15 toward and away from the operator as pictured in FIGURE 1 or up and down relative to the axis A as viewed in FIGURE 5.

The indicating means 27 is responsive to movement of the control means for the frame to visibly relate the position of frame 15 to the light path A. The indicator illustrated is positioned beneath the panel 19 and includes an elongated channel-shaped frame 56 which is movable in a plane parallel to the plate 17 and panel 19. The frame 56 has a slot 57 formed in the base which extends lengthwise thereof as best shown in FIGURE 4.

One end of the frame 56 is provided with aligned holes in the side flanges which receive a support rod 61. The rod 61 supports the frame 56 and is supported at its ends from the plate 17 by posts 62 and 63. The flanges of frame 56 are also provided with aligned holes which receive opposed trunnions secured to and forming a part of a pulley 66 mounted between said flanges. The pulley 66 has an axial bore to slidably receive the shaft 44. A pin 67 extends through the pulley 66 and the slot 45 in shaft 44 to rotate said pulley upon rotation of said shaft. At the other end of the frame 56 and rotatably supported between the flanges is a shaft 67 which carries a pulley 68.

The indicator 27 further comprises a slidable spotting member 71, which in the present embodiment is formed of an opaque polymeric material, shaped to support a small lamp and to be supported for sliding movement within the slot 57 of the frame 56. The member 71 has an enlarged opening 72 (FIGURE 3) in which the lamp (not shown) and suitable supporting means 74 are placed. A smaller bore 73 communicates with opening 72 to form a small light spot on the panel 19. The spot of light will represent on the panel 19 the position of the projection axis A relative to the transparency supporting frame. Suitable terminals are secured to the member 71 to receive the ends of flexible electrical leads for energizing the lamp.

A tension member or string 78 is directed around the pulley 66 and the pulley 68 and has its ends connected to the member 71. Rotation of the pulley 66 will thus cause movement of the string 78 to move the member 71 longitudinally of the frame 56 within the slot 57. Rotation of the knob 24 rotates the pulley 54 through pinion 51 and gear wheel 52. A second tension member or cord 81 is entrained about the pulley 54 and a pulley 82 and is attached at its ends to the frame 56. The pulley 82 is supported and positioned adjacent the side of the panel 19 opposite pulley 54 and is fixed on a shaft 83 rotatably supported in a sleeve 84 mounted on the plate 17. The rotation of the pulley 54 thus causes movement of frame 56 transversely of the panel 19 along the shaft 44 and rod 61.

Referring now to FIGURES 1, 5, 6 and 7, wherein the transparency supporting frame 15 is shown in detail, it will be seen that the frame is supported by a wall 91 extending longitudinally or from the front to the back of the projector viewer, and by brackets 92, 93 and 94 which depend from a slightly inclined support deck 96. As noted in FIGURES 1 and 6 the frame is supported in an area between the support deck 96 and a lower spaced parallel deck 97. The transparency supporting frame 15 comprises a main frame 101 and a subframe 102. The frame 101 is an irregularly-shaped frame formed with three support shaft receiving bearing portions 103, 104 and 105. The bearing portions 103 and 104 slidably receive therein a shaft 106 which is fixedly mounted to the projector frame by deck 96 and depending brackets 93 and 94. The bearing portions 103 and 104 allow movement of the frame 101 along the shaft 106. Bearing portion 105 is formed in an arm 108 of the frame 101 and slidably and rotatably receives therein a shaft 107. The shaft 107 is polygonal in cross-section and is rotatably supported between the wall 91 and the bracket 92. The bearing portion 105 receives a bushing 109 having a circular outer circumferential surface mating with the portion 105 and has a central opening shaped to correspond to the cross-section of and slidably receive the shaft 107, see FIGURE 7.

A rack 111 is affixed to the frame 101 and extends generally parallel to the axis of shaft 106. The rack 111 is engaged by a pinion 112 which is supported on a shaft 113 journalled in the deck 97. The shaft 113 is adapted to be connected directly to the flexible torque transmitting cable 34 which is driven by the knob 23. Rotation of the pinion 112 by cable 34 affords movement of the frame 101 along the shaft 106.

Frame 101 supports the movable subframe 102 in a cantilever fashion from the arm 108 thereof and from a rod 114. The rod 114 extends from an end portion on the arm 108 to the main body of the frame 101. Rod 114 is also normal to the support rods 106 and 107 for the frame 15.

The subframe 102 comprises a generally planar support portion 115 having a pair of pillow blocks 116 and 117 slidably supporting the subframe 102 from the rod 109 for movement with said rod. Subframe 102 is moved along rod 109 by a rack 118, fixed thereto, and a pinion 119 affixed to the bushing 109 which is supported in the bracket portion 105. Rotation of the shaft 107 thus causes rotation of the bushing and the pinion 119 to move the frame 102 along the shaft 109 from one side to the other. Supported on the support portion 115 of the frame 102 by a pair of pins 122 and 123 and frames 124 are a pair of planar transparent plates 126 and 127. The upper glass plate 127 is movable with respect to the lower glass plate 126 about its connection with the pins 122 and 123 to afford insertion and removal of a microfiche card such as 125 from between the plates. The weight of the upper plate 127 keeps the card 125 flat and normal to the axis A in a fixed focal plane to afford good projection of the images.

A portion of the image projection system is illustrated in FIGURES 1 and 6, and comprises a light source; including a lamp 131 in a holder 132, a reflector 133 and condensing lenses 134, 135 and 136, supported below the plate 97; and an objective lens supported in a barrel 137. The lamp 131, lamp housing and reflector 133 are mounted on a collar 138 which collar is adjustable relative to the condensing lenses. From the objective lens the light is reflected from a first reflector 139, positioned thereabove, to an oblique keystone mirror 141, from which it strikes the back surface of the ground glass screen 12 for right reading by the operator.

From the above it will be seen that movement of the knob 23 affords movement of the spot of light upward and downward relative to the panel 19 and movement of the transparency supporting frame 15 to position the frame such that the position of the projection axis A relative to the frame is the same as that of the spot of light relative to the panel 19 and a template 18. Similarly, movement of the knob 24 affords movement of the spot of light to the right or left of the panel 19 and side-to-side movement of the transparency supporting frame 15 relative to the projection axis A.

Thus by placing a template 18, having a printed format illustrating the exact position of the images on a corresponding microfiche, over the panel 19 and placing the microfiche between the plates 126 and 127 of frame 15, the operator can readily find and project any desired image by proper manipulation of the knobs 23 and 24 to position the indicating device, here a spot of light, on the corresponding image area on the template. Movement from one image to another is also readily accomplished by simply viewing the template and indicator while manipulating the control knobs.

The size of the transparent card may be scaled relative to the actual size of the microfiche and corresponding ratios are provided for moving the indicating device. Because various sized transparencies and templates may be used in the projector, a reference corner on the panel 19 and frame 15, such as the lower left-hand corner of the panel 19 (as viewed in FIGURE 1) and the upper left corner of the plates 126 and 127 (as viewed in FIGURE 5), are selected against which the template and microfiche, respectively should be registered.

FIGURES 8, 9 and 10 disclose a projector viewer 150 incorporating a modification of the present invention and like parts to those of FIGURES 1 through 7 will be referred to by the same reference numeral. The plate 17 illustrated in FIGURE 8 has a rectangular panel 19 set therein and raised border means 149 for supporting a template 18 over said panel. A narrow vertically disposed slot 151 is formed in the plate 17. A rotatable shaft 152 projects upwardly through the slot and carries on its upper end a knob 153.

The image locating and indicating system is schematically illustrated in FIGURE 9 and comprises a pair of spaced support members 154 and 155 depending from the plate 17. A fixed circular rod 157 and a journalled polygonal shaft 158 extend between the members 154 and 155. Slidably mounted along the rod 157 and shaft 158 is an inverted U-shaped carriage 159 having a plate portion 151 and two depending flanges 162 and 163. The shaft 152 is journalled in the plate portion 161 and carries the knob 153 on one end and a bevel gear 164 on the other end. A pulley 166 is fixed to the shaft 152 intermediate its ends and as illustrated is below plate 17 and above the plate portion 161.

Fixed rigidly to the carriage 159 are a pair of parallel rods 167 and 168, the opposite ends of which are secured to a transverse pulley supporting block 169, slidably mounted on a rail 170, and on which is mounted a pair of pulleys 171 and 172. A spotting device comprising a support member 173 is slidably mounted on and extends between the rods 167 and 168. The member 173 carries a small lamp or other small indicating element 174. A string 176 is drawn around the pulleys 166, 171 and 172 and has its opposite ends connected to one side of the member 173 as at 177. Rotation of the knob 153 and shaft 152 rotates the pulley 166, driving the string 176 around the pulleys 171 and 172, to move the member 173 along the rods 167 and 168 toward or away from the carriage and sideways beneath the panel 19. Rotation of shaft 152 also turns the bevel gear 164 which meshes with a second bevel gear 178 slidably but nonrotatably mounted on the shaft 158 to rotate the same. An idler gear 179 also meshes with gear 164 but is both slidable on and rotatable on the shaft 158. When the shaft 158 is rotated an extended portion thereof drives, through a universal joint 181, shaft 182, and gear box 183, the rod 107 which affords fore and aft movement of a transparency supporting frame 15 through the pinion 119 and rack 118.

Movement of the knob 153 along the slot 151 moves the carriage 159 along the rod 157 and shaft 158. This moves the indicator 174 upward or downward relative to the panel 19. This movement is also coupled to the frame 15 by a cord 184 which is fixed at each end to the carriage 159 and extends around a series of pulleys and guide rollers to rotate a pulley 186 fixed to the lower portion of the shaft 113 which drives the pinion 112 to move the frame 15 along the rod 106. Movement of the knob 153 toward and away from the operator along the slot 151 moves the frame 15 to the right and to the left of the machine respectively, as viewed in FIGURE 9.

The positioning control and indicating device of either embodiment affords movement of the remotely supported transparency orf microfiche to a position relative to the projected light path as determined by the location of the visible indicating device on the template.

Having thus described the invention with reference to a drawing disclosing several embodiments of the invention, each of which are considered satisfactory constructions for carrying out the invention, it shall be understood that these embodiments are merely illustrations and not limitations of the scope of this invention.

What is claimed is:
1. In an apparatus for handling transparencies bearing multiple images, the combination of:
   (a) means defining a fixed reference line in said apparatus,
   (b) frame means for supporting a said transparency, said frame means being mounted for movement in a plane intersecting and normal to said reference line, said frame including a pair of racks disposed normal to each other and to said reference line,
   (c) a fixed translucent indicating panel,
   (d) indicating means movable relative to said panel for indicating on said panel the relative position of said frame means and said reference line, said indicating means comprising
- (1) a movable frame mounted below said panel,
- (2) a support member,
- (3) means mounting said support member on said frame means for movement therewith and for movement thereon, and
- (4) means carried by said support member for producing a small spot of light which will be directed at and visible through said panel, and (e) manually operable control means positioned adjacent said panel and connected to said indicating means for moving the same relative to said panel and connected via pinions to said racks for moving said frame means relative to said reference line simultaneously whereby the said frame means is readily positioned in relationship to said fixed reference line by positioning said spot of light of said indicating means at a desired position with respect to said panel.

2. An image projection device for use in projecting individual frames from a transparency containing a plurality of images arranged thereon in a predetermined order, said device comprising:
- (a) projection means for projecting light along a predetermined projection axis,
- (b) transparency supporting frame means positioned in a plane normal to and intercepting said projection axis and comprising plate means for supporting a said transparency,
- (c) a panel,
- (d) support means for supporting over said panel a template having thereon a format corresponding to the order of said images on a said transparency,
- (e) movable indicator means for producing a visible light spot on said panel, and
- (f) control means supported on said device for controlling said indicator means to move said light spot relative to said panel and template and for correspondingly moving said supporting frame relative to said projection axis for indicating by said light spot on said template the location of said supporting frame with respect to said projection axis, said control means comprising
  - (1) a single control knob,
  - (2) a carriage supporting said control knob for rotational movement and said carriage being movable by sliding movement of said knob, and
  - (3) means connected to said carriage and said knob for moving said frame means and said indicator means upon rotation of said knob and for moving said frame means and said indicator means upon sliding movement of said knob and carriage.

References Cited

UNITED STATES PATENTS

| | | | |
|---|---|---|---|
| 2,660,920 | 12/1953 | McChesney | 88—24 |
| 2,847,901 | 8/1958 | Sassaman et al. | 88—24 |
| 3,224,326 | 12/1965 | Brownscombe | 88—24 |
| 3,267,801 | 8/1966 | Abbott et al. | |

FOREIGN PATENTS

| | | |
|---|---|---|
| 867,758 | 2/1953 | Germany. |
| 1,430,277 | 1/1966 | France. |

NORTON ANSHER, Primary Examiner

RICHARD M. SHEER, Assistant Examiner

U.S. Cl. X.R.

353—40, 42